United States Patent
Marelli et al.

(10) Patent No.: US 7,908,543 B2
(45) Date of Patent: Mar. 15, 2011

(54) READING METHOD OF A MEMORY DEVICE WITH EMBEDDED ERROR-CORRECTING CODE AND MEMORY DEVICE WITH EMBEDDED ERROR-CORRECTING CODE

(76) Inventors: Alessia Marelli, Dalmine (IT); Valeria Intini, Putignano (IT); Roberto Ravasio, Ponte San Pietro (IT); Rino Micheloni, Turate (IT)

( * ) Notice: Subject to any disclaimer, the term of this patent is extended or adjusted under 35 U.S.C. 154(b) by 1048 days.

(21) Appl. No.: 11/713,376

(22) Filed: Mar. 1, 2007

(65) Prior Publication Data
US 2007/0234164 A1 Oct. 4, 2007

(30) Foreign Application Priority Data

Mar. 2, 2006 (EP) .................................... 06425141

(51) Int. Cl.
*H03M 13/00* (2006.01)
(52) U.S. Cl. ........................................................ 714/782
(58) Field of Classification Search .................. 714/746, 714/763, 782
See application file for complete search history.

(56) References Cited

U.S. PATENT DOCUMENTS

| 6,389,571 B1 * | 5/2002 | Yang et al. ..................... 714/766 |
| 6,990,622 B2 * | 1/2006 | Davis et al. .................... 714/763 |

FOREIGN PATENT DOCUMENTS

| EP | 0 305 987 A2 | 3/1989 |
| EP | 0 305 987 A3 | 3/1989 |
| EP | 0 428 396 A2 | 5/1991 |
| EP | 0 428 396 A3 | 5/1991 |

OTHER PUBLICATIONS

Carl E. W. Sundberg, Erasure and error decoding for semiconductor memories, Aug. 1978, IEEE, Trans. on Comp. vol. C-27, No. 8, p. 696-705.*
European Search Report, EP 06 42 5141, dated Nov. 21, 2006.

* cited by examiner

*Primary Examiner* — Shelly A Chase
(74) *Attorney, Agent, or Firm* — Schwabe Williamson & Wyatt

(57) ABSTRACT

A reading method for a memory device with error-correcting encoding envisages the steps of: carrying out a first reading of a plurality of memory locations (A0, A1, . . . , ALS−1) to generate a first recovered string (S1), and performing a first decoding attempt using the first recovered string (S1). When the first decoding attempt fails, the memory locations are read at least one second time, and at least one second recovered string (S2-SN) is generated. On the basis of a comparison between the first recovered string (S1) and the second recovered string (S2-SN), a modified string (SM) is generated, in which erasures (X) are located, and at least one second decoding attempt is carried out using the modified string (SM).

22 Claims, 7 Drawing Sheets

READING METHOD OF A MEMORY DEVICE WITH EMBEDDED ERROR-CORRECTING CODE AND MEMORY DEVICE WITH EMBEDDED ERROR-CORRECTING CODE

PRIORITY CLAIM

The present application claims priority from European Patent Application No. 06425141.6 filed Mar. 2, 2006, the disclosure of which is hereby incorporated by reference.

BACKGROUND OF THE INVENTION

1. Technical Field of the Invention

The present invention relates to a reading method for a memory device with embedded error-correcting code and to a memory device with embedded error-correcting code.

2. Description of Related Art

As is known, some memory devices, especially of a non-volatile type and, in particular, NAND Flash memories, intrinsically suffer from a high reading/writing bit error rate (BER). In order to overcome this problem, memory devices which are more error prone are today provided with encoding and decoding modules based upon error-correcting codes (ECCs). In practice, ECCs add a pre-determined number of control bits to the usable information that must be stored and enable automatic correction of a given number of errors that may occur both during the writing step and during the reading step. The correction capacity of a code is calculated on the basis of the number of parity bits and the length of the word of the code.

A type of cyclic ECC used successfully is the BCH (Bose-Chaudhuri-Hocquenghem) code, which is well known and widely exploited in the telecommunications sector.

Many nonvolatile memory devices are, however, also subjected to degradation with use, so that the reading/writing error rate tends to increase over time. For example, in Flash memories, both of a NAND type and of a NOR type, the gate oxide of the cells degrades on account of ageing and electrical stresses. Consequently, the distributions of the threshold voltage values associated with the various programming levels of the cells tend to approach and to overlap one another so that reading errors become inevitable. In practice, as drifts in the threshold-voltage distributions of a cell arise, the result of the reading/writing process becomes increasingly random (more precisely, the sensitivity to random fluctuations increases and hence also the likelihood increases of two successive readings of the same cell in the same configuration yielding different results).

Consequently, over time the average number of reading/writing errors exceeds the correction capacity of the ECC, and the memory device becomes unreliable.

There is a need in the art to overcome the limitations described above, and, in particular, to prolong the useful life of a memory device with ECC.

SUMMARY OF THE INVENTION

Generally speaking, the present invention concerns a reading method of a memory device with embedded error-correcting code and a memory device with embedded error-correcting code.

In an embodiment, a reading method for a memory device with embedded error-correcting code (ECC) comprises: executing a first reading of a plurality of memory locations, to generate a first recovered string; performing a first decoding attempt using said first recovered string; performing at least one second reading of said memory locations to generate at least one second recovered string if said first decoding attempt failed; comparing said first recovered string and at least said second recovered string to generate a modified string in which erasures are located; and executing at least one second decoding attempt using said modified string.

In another embodiment, a memory device with embedded error-correcting code (ECC), comprises: a memory array; a read circuit for reading said memory array and generating recovered strings; and an error-correcting encoding and decoding device, including a decoding module for decoding said strings. The error-correcting encoding and decoding device comprises an erasure-locator module, selectively activatable when said decoding module fails a first decoding attempt using one said first recovered string generated by said read circuit following upon a first reading of said memory locations. The erasure-locator module requests at least one second reading of said memory locations, receives at least one further recovered string generated by said read circuit on the basis of said at least one second reading of said memory locations, generates, on the basis of a comparison between said first recovered string and at least said second recovered string, a modified string in which erasures are located, and supplies said modified string to said decoding module for a second decoding attempt, using said modified string.

In an embodiment, a reading method for a memory device comprises: executing a first reading of a plurality of memory locations, to generate a first recovered string encoded with an error correcting code; first decoding of said first recovered string; executing at least one second reading of said memory locations to generate at least one second recovered string if said first decoding fails; comparing said first recovered string and at least said second recovered string to generate a modified string which includes an identification of bit erasures; and second decoding of said modified string.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION

The invention exploits the capacity of cyclic error-correcting codes (ECCs) normally used in the telecommunications sector for correcting the so-called erasures, which occur when a receiver is not able to assign a value to a bit in a stream, for example, on account of a disturbance. It should be noted that erasures are different from errors. An erasure corresponds to a missing or indeterminate value in a known position of the stream, whereas an error occurs when, at the receiver end, a value is attributed to a bit in a stream different from the corresponding transmitted bit. The errors can be detected (and corrected) only in the decoding step, exploiting the correction capacity of the ECC. The position of the erasures in the stream is instead known already prior to decoding. For this reason, it is possible to correct a number of erasures greater than the number of errors.

The relation between the number of erasures and the number of errors that can be corrected by an error-correcting code is defined by the following inequality:

$$2\,ERR+ERS<D \tag{1}$$

where ERR is the number of errors, ERS is the number of erasures, and D is the Hamming distance between two adjacent words of the ECC. In other words, decoding fails if the number of errors ERR and the number of erasures ERS are such that the inequality (1) is not verified.

Figure 1:
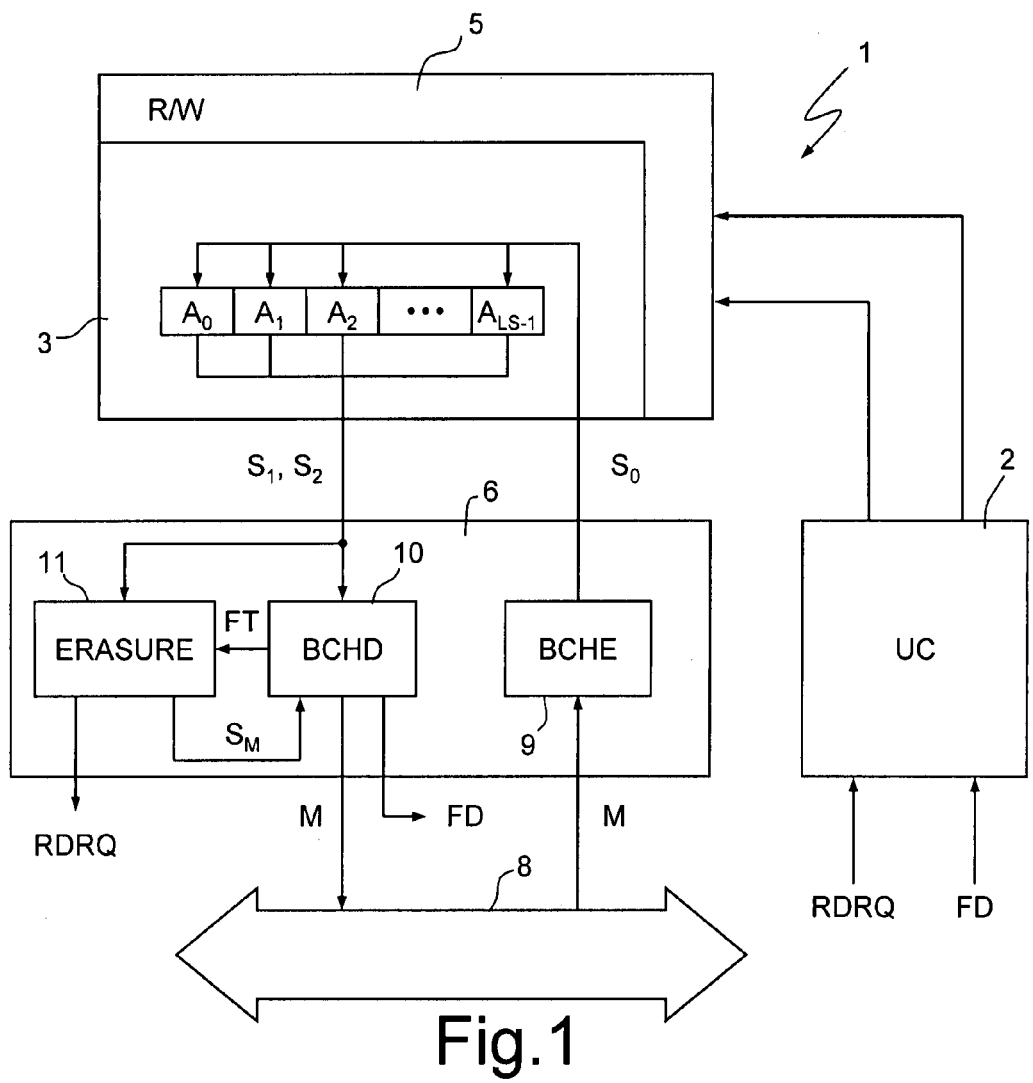
FIG. 1 is a simplified block diagram of a memory device implementing a reading method according to a first embodiment of the present invention.

With reference to FIG. 1, the reference number 1 designates a nonvolatile-memory device with an embedded ECC. In the embodiment described herein, the memory device is a NAND Flash memory. It is understood, however, that the invention can be exploited in volatile and nonvolatile memory devices of any type, in particular NOR Flash memories and bulk memories with magnetic or optical medium such as hard disks, floppy disks, compact disks, DVDs, etc.

The memory device 1 comprises a control unit 2, an array 3 of memory cells (not shown individually), a read/write (or R/W) circuit 5, an ECC encoding/decoding device 6 and a data bus 8.

In addition, in the embodiment described, the ECC encoding/decoding device 6 is based upon the use of a BCH code and comprises an encoding module 9, a decoding module 10, and an erasure-locator module 11. The use of a BCH code must not, however, be considered limiting, in so far as any cyclic embedded error-correcting code can be used.

When a writing operation is carried out, a message M of a pre-determined length is loaded into the encoding module 9 from the data bus 8 and encoded by a known procedure, not described herein. An origin string $S_0$ of length LS, obtained by encoding the message M, is then stored in the array 3 at memory locations $A_0, A_1, \ldots, A_{LS-1}$ (each bit of the origin string $S_0$ is stored in a cell corresponding to an addressed memory location; in the case of multilevel memories, a number of bits is stored in a single cell). For this purpose, the control unit 2 issues a command for writing W appropriately synchronized with the R/W circuit 5.

Assume, for convenience, that, in a subsequent reading step, the same memory locations $A_0, A_1, \ldots, A_{LS-1}$, in which the origin string $S_0$ had been previously stored, are read. The control unit 2 sends a read command R to the R/W circuit 5, and a recovered string $S_1$ is loaded into the decoding module 10, which carries out a first decoding attempt. In the absence of reading and/or writing errors, the recovered string $S_1$ coincides with the origin string $S_0$, the first decoding attempt succeeds, and the decoding module 10 returns the message M, which is made available on the data bus 8. However, the first decoding attempt is successful and the message M is returned even if the number of errors ERR in the recovered string $S_1$ (irrespective of whether they have been generated in the reading step or in the writing step) is less than half the Hamming distance D between adjacent words of the BCH code.

Owing to ageing of the array 3, however, it may happen that the number of errors ERR exceeds the correction capacity of the BCH code. In this case, the first decoding attempt fails, and the decoding module 10, by a temporary failure signal FT, activates the erasure-locator module 11 to carry out a procedure of erasure identification. The procedure of erasure identification, which will be illustrated in detail hereinafter, includes one or more further decoding attempts.

If one of the further decoding attempts is successful, the message M is returned and made available on the data bus 8. Otherwise, the decoding module 10 issues a definitive -failure signal FD to the control unit 2, and the reading operation terminates.

Figure 2:
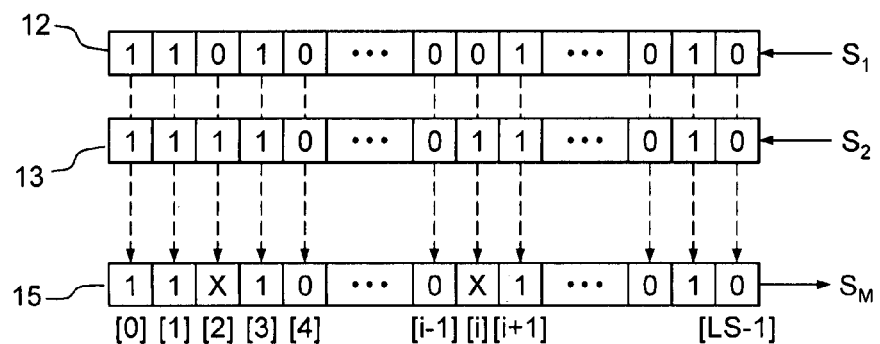
FIG. 2 is a more detailed block diagram of a part of the memory device of FIG. 1.

FIG. 2 is a schematic illustration of the structure of the erasure-locator module 11, which comprises two read registers 12, 13 and an auxiliary register 15. The read registers 12, 13 contain a number of bits equal to the length LS of the recovered string $S_1$, whereas the auxiliary register 15 is capable of storing at least three values for each bit of the recovered string $S_1$ (in the case described, hence, the auxiliary register 15 comprises two bits for each bit of the recovered string $S_1$).

Figure 3:
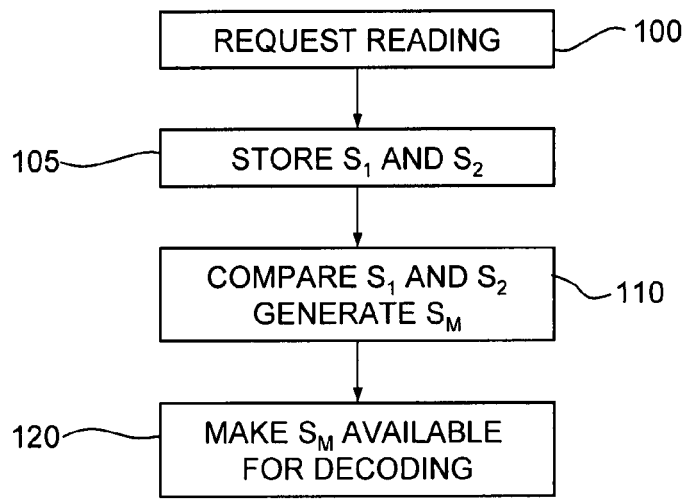
FIG. 3 shows a flowchart relating to the method according to the first embodiment of the invention.

FIG. 3 shows a flowchart relating to the erasure-location procedure carried out by the erasure-locator module 11. When it is activated following upon a failed decoding attempt, the erasure-locator module 11 sends a read-request signal RDRQ to the control unit 2 in order to request a new reading of the memory locations $A_0, A_1, \ldots, A_{LS-1}$ of the array 3 already read (block 100). The recovered string $S_1$ and a further recovered string $S_2$, acquired following upon the new reading request, are loaded into the read registers 12, 13 of the erasure-locator module 11 (block 105). The recovered string $S_2$ can differ in some bits from the recovered string $S_1$ because some of the cells that have caused failure of the preceding decoding attempt are in a critical condition of the threshold voltage drift. In other words, the drift of the threshold -voltage distributions causes a high sensitivity to random fluctuations of the electrical quantities involved during the read/write operations, and hence successive readings of the same cell in the same conditions can yield different results.

A bit-to-bit comparison of the recovered strings $S_1$, $S_2$ is then made, and the result of the comparison is stored in the auxiliary register 15 (block 110). In greater detail, if two corresponding bits of the recovered strings $S_1$, $S_2$ have the same value (value 0 or value 1), this value is stored in the corresponding position of the auxiliary register 15 (FIG. 2). In the positions of the auxiliary register 15 corresponding to discordant bits of the recovered strings $S_1$, $S_2$, an erasure indicator X is stored. Consequently, at the end of this step, the auxiliary register 15 contains a modified string $S_M$ in which there are stored the values of the bits of the recovered strings $S_1$, $S_2$ that have yielded concordant reading results and, possibly, erasure indicators X, in positions corresponding to bits, the value of which could not be determined, because the readings did not yield the same result.

Next (block 120), the modified string $S_M$ is made available to the decoding module 10, which is configured for decoding strings containing erasures.

Figure 4:
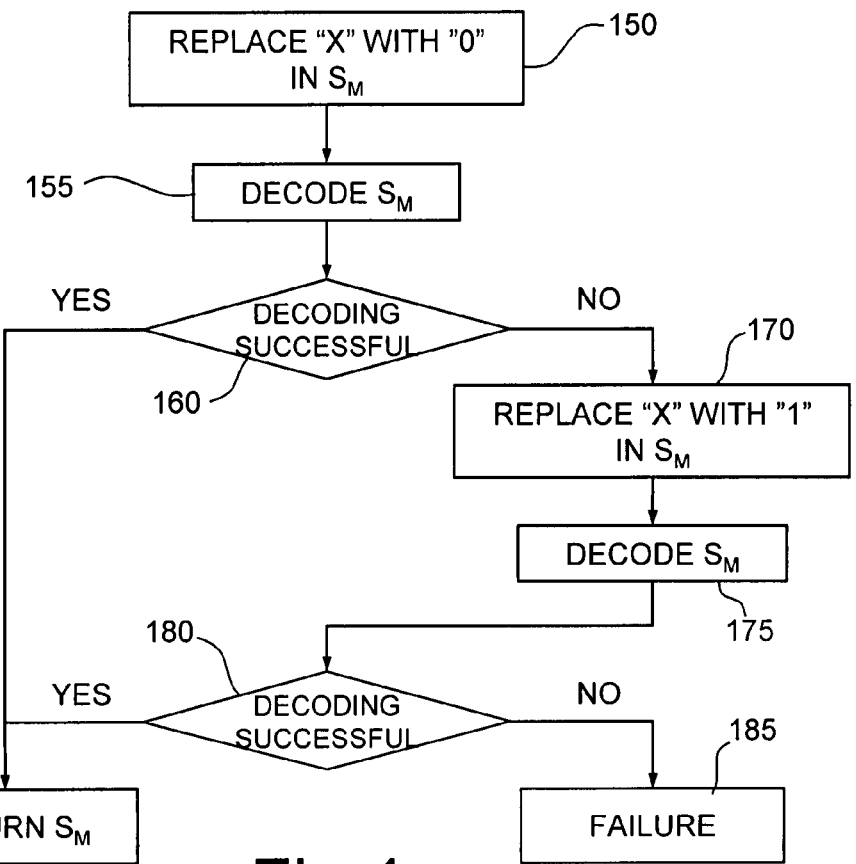
FIG. 4 shows a flowchart relating to the method according to the invention.

The decoding procedure is illustrated in FIG. 4. Initially, the erasure indicators X are replaced with the value 0 (block 150), and a second decoding attempt is made (after the first decoding attempt of the recovered string $S_1$ has failed), also exploiting the information on the position of the erasures in the modified string $S_M$ (block 155). Decoding with erasure handling is executed according to a known method, which envisages calculating the syndromes, searching for the error-locator polynomial by the Berlekamp recursive algorithm and searching for the roots of the error-locator polynomial by applying the Chien algorithm.

If the second decoding attempt is successful (output YES from block 160), the message M is returned and made available on the data bus 8 (block 165).

Otherwise (output NO from block 160), the decoding module 10 replaces the erasure indicators X with the value 1 (block 170) and makes a third decoding attempt, still using the modified string $S_M$ (block 175).

If the third decoding attempt is successful (output YES from block 180), the message M is returned and made available on the data bus 8 (block 165).

If, instead, also the third decoding attempt fails (output NO from block 180), the decoding module 10 generates the definitive-failure signal FD (block 185), and the reading operation terminates.

In practice, re-reading advantageously enables identification of the memory locations corresponding to cells that yield incoherent reading results. The corresponding positions of the modified string can be labelled as erasures, improving the likelihood of the decoding being successful after the first failure of the conventional BCH code (a fact that always occurs when the number of errors exceeds the correction capacity of the code). In this way, the life of the memory device 1 is prolonged.

Figure 5:
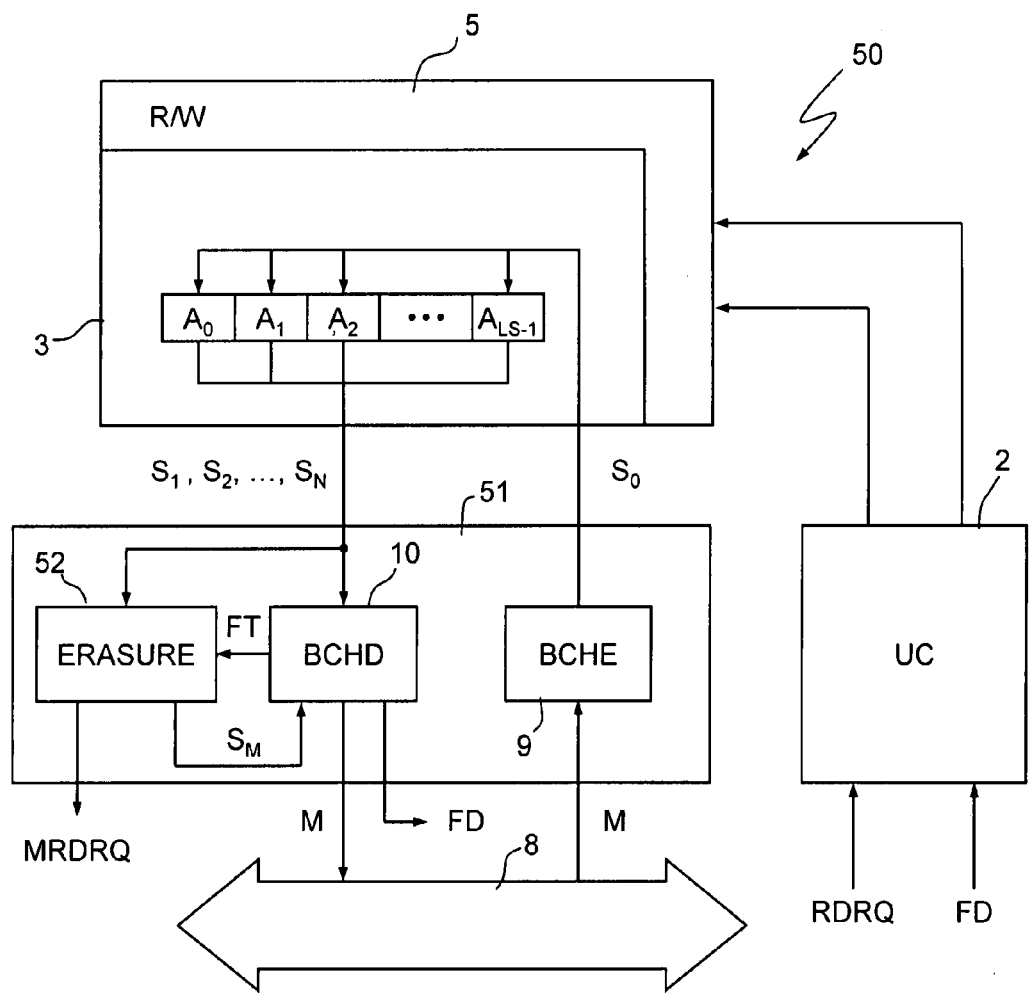
FIG. 5 is a simplified block diagram of a memory device implementing a reading method according to a second embodiment of the present invention.
Figure 6:
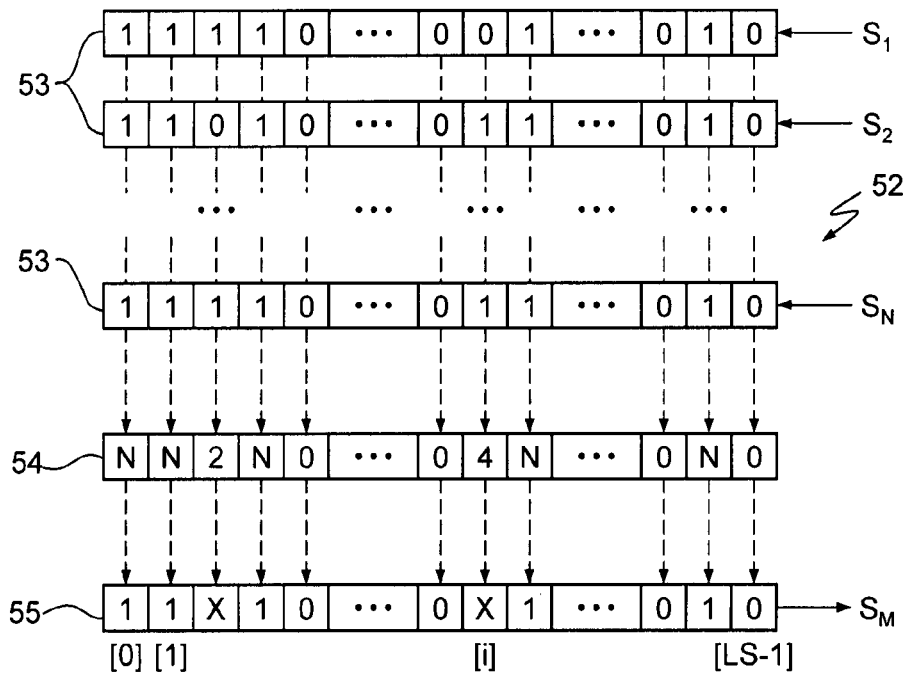
FIG. 6 is a more detailed block diagram of a part of the memory device of FIG. 5.
Figure 7:
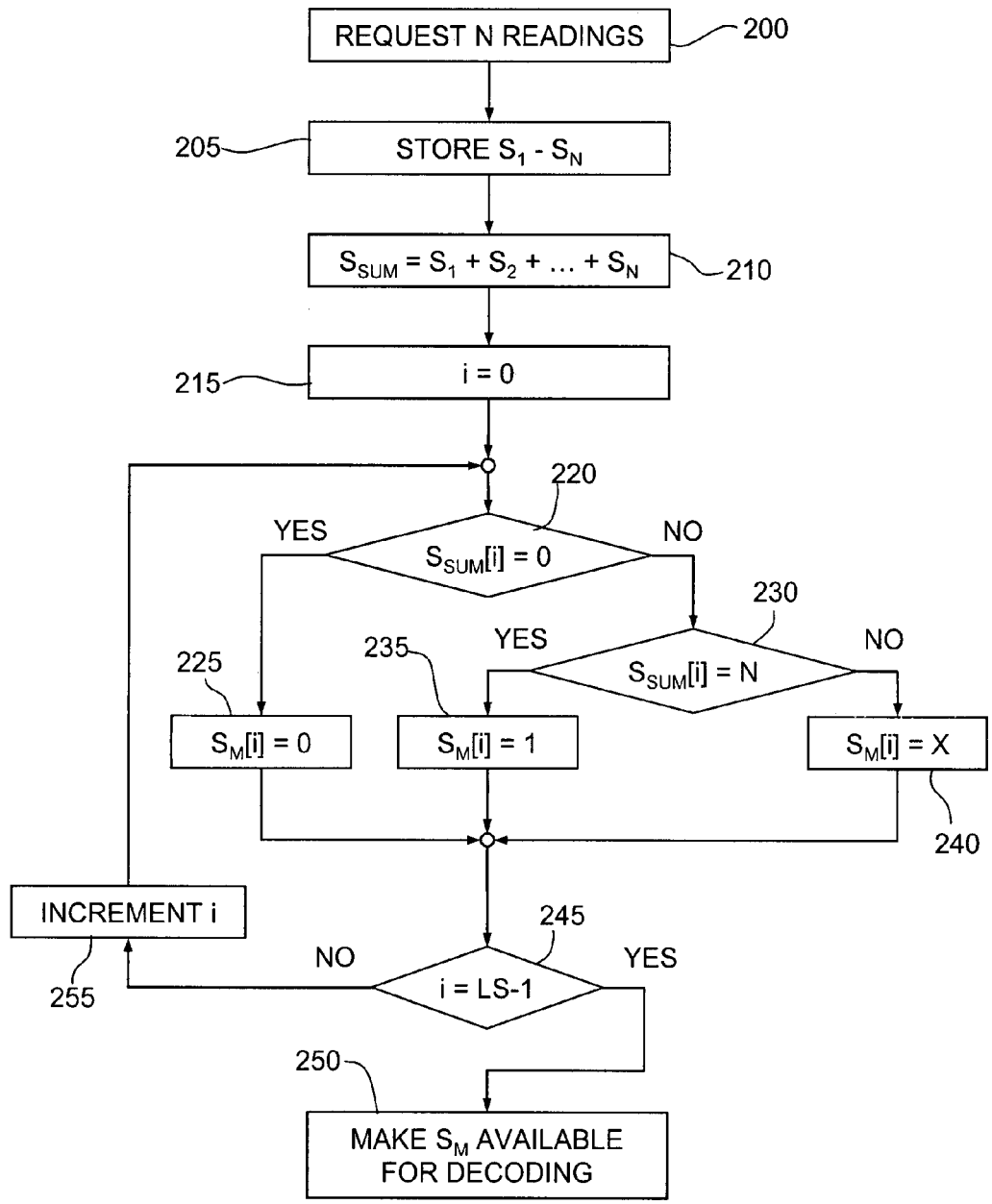
FIG. 7 shows a flowchart relating to the method according to the second embodiment of the invention.

A second embodiment of the invention is illustrated in FIGS. 5-7, where parts that are the same as the ones already described are designated by the same reference numbers.

In this case (FIG. 5), a memory device 50 comprises the control unit 2, the array 3 of memory cells, the read/write (R/W) circuit 5, an ECC encoding/decoding device 51, and the data bus 8.

In addition, the ECC encoding/decoding device 6, based upon the use of a BCH code, comprises the encoding module 9, the decoding module 10 and an erasure-locator module 52, which has the structure illustrated in FIG. 6. In particular, the erasure-locator module 52 comprises a plurality of read registers 53 (five in the example described), a sum register 54 and an auxiliary register 55. The read registers 53 have a number of bits equal to the length LS of the recovered string $S_1$, while the sum register 54 contains an integer number for each bit of the recovered string $S_1$ (in practice, LS integer numbers), and the auxiliary register 55 is able to store three values per bit of the recovered string $S_1$.

If, in the reading step, a first decoding attempt of the recovered string $S_1$, the erasure-locator module 52 is activated and executes a location procedure, which will be described hereinafter with reference to FIG. 7.

Upon activation, the erasure-locator module 52 requests a multiple re-reading of the memory locations $A_0, A_1, \ldots, A_{LS-1}$ already read, by a multiple-read request signal MRDRQ (block 200). In this way, in all N recovered strings $S_1, S_2, \ldots, S_N$ (for example N=5) are acquired, which are stored in respective read registers 53 (block 205).

A bit-to-bit addition of the recovered strings $S_1, S_2, \ldots, S_N$ is made, and the results are stored in corresponding positions of the sum register 54, thus defining therein a sum string $S_{SUM}$ (block 210). In practice, if all of the bits in a generic i-th position of the recovered strings $S_1, S_2, \ldots, S_N$ have the value 0, the corresponding position $S_{SUM}[i]$ of the sum string $S_{SUM}$ contains the value 0; if all of the bits in the i-th position of the recovered strings $S_1, S_2, \ldots, S_N$ have the value 1, the corresponding position $S_{SUM}[i]$ of the sum string $S_{SUM}$ contains the value N; finally, if the bits in the i-th position of the recovered strings $S_1, S_2, \ldots, S_N$ have discordant values, the corresponding position $S_{SUM}[i]$ of the sum string $S_{SUM}$ contains a value comprised between 1 and N−1 and equal to the number of bits having the value 1.

The sum string $S_{SUM}$ is then scanned to perform location of the erasures. At the end of this step, which will be described hereinafter, the auxiliary register 55 contains a modified string $S_M$, which has erasure indicators X in positions corresponding to the memory locations $A_0, A_1, \ldots, A_{LS-1}$ that have yielded discordant reading results. After a counter i has been initialized (block 215), the erasure-locator module 52 checks whether the value stored in the current position $S_{SUM}[i]$ of the sum string $S_{SUM}$ indicated by the counter i is equal to 0 (block 220). If so (output YES from block 220), the readings have returned concordantly the value 0, which is hence assigned to the position $S_M[i]$ of the modified string $S_M$ indicated by the counter i (block 225).

Otherwise (output NO from block 220), the erasure-locator module 52 checks whether the value stored in the current position $S_{SUM}[i]$ of the sum string $S_{SUM}$ is equal to N (block 230). If this condition is verified (output YES from block 230), the readings have returned concordantly the value 1, which is assigned to the position $S_M[i]$ of the modified string $S_M$ (block 235). If, instead, the condition is not verified (output NO from block 230), at the position $S_M[i]$ of the modified string $S_M$ an erasure indicator X is stored, since there have been discordant readings (block 240).

If the counter i indicates that the entire sum string $S_{SUM}$ has been scanned (i.e., i=LS−1, output YES from block 245), the modified string $S_M$ is made available to the decoding module 10 (block 250) for being decoded as already explained with reference to FIG. 4 (substitution of the erasure indicators with the value 0 and second decoding attempt; possibly, in the case of failure of the second decoding attempt, substitution of the erasure indicators with the value 1 and third decoding attempt). If, instead, the scanning of the sum string $S_{SUM}$ is not yet terminated (output NO from block 245), the counter i is incremented (block 255) and the operations indicated in blocks 220-240 are repeated.

Note that, using the procedure described, the corresponding bits of the recovered strings are in effect compared with one another, and the value of the bit in the corresponding position of the sum string $S_M$ is decided on the basis of the result of the comparison (the sum, in practice, supplies in a synthetic way of the result of the bit-to-bit comparison). If there is concordance, it is possible to determine also the value of the bit in the corresponding position of the sum string $S_M$. Otherwise, an erasure is located, and an erasure indicator X is inserted in the sum string $S_M$.

In the embodiment just described, reading repeatedly the same locations of the array 3 increases the likelihood of identification of unstable cells, which yield discordant results. In this way, the life of the memory device 50 is further prolonged.

Figure 9:
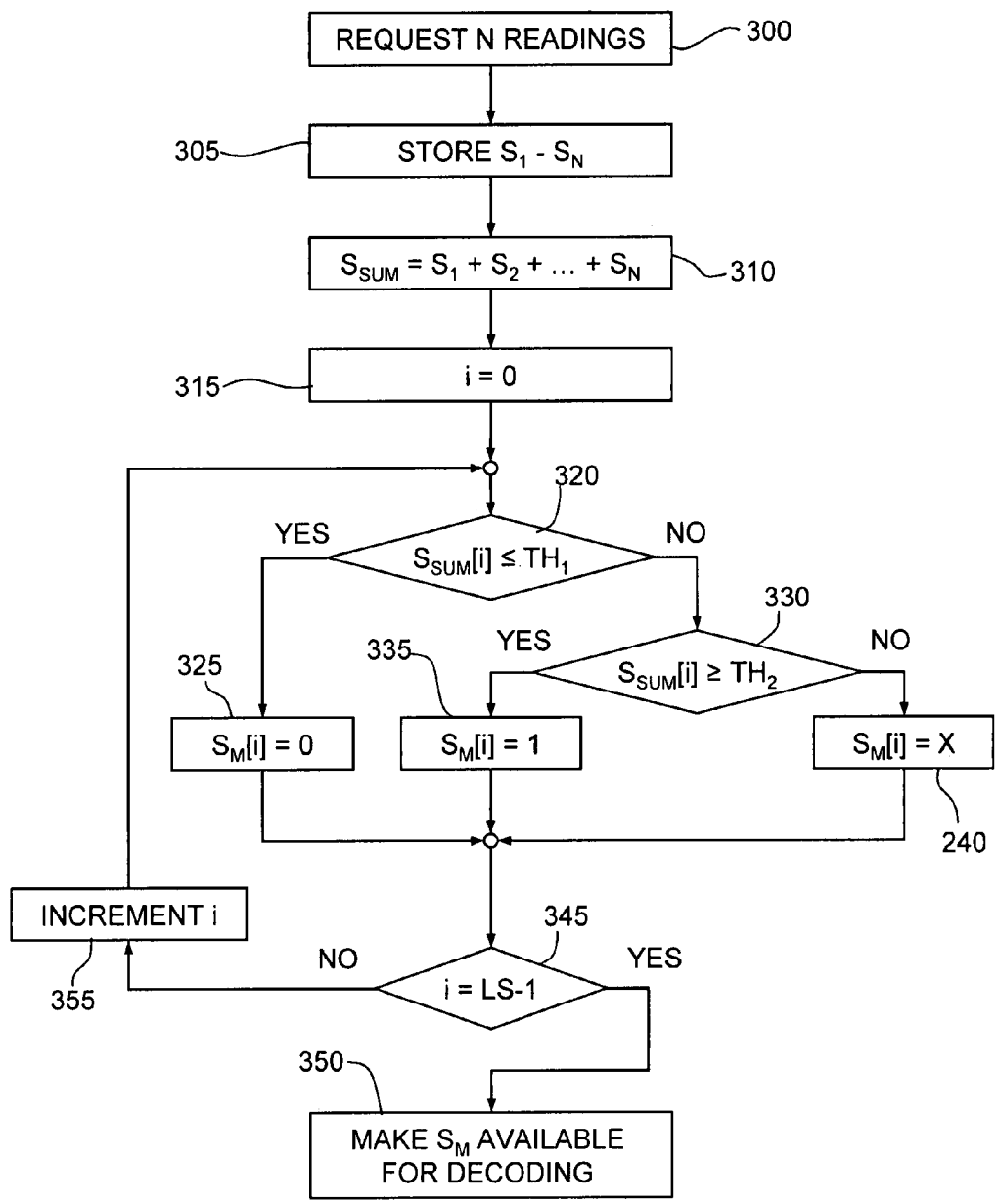
FIG. 9 shows a flowchart relating to the method according to the third embodiment of the invention.

According to a third embodiment of the invention, the erasure-locator module 52 is configured for executing the location and correction procedure illustrated in the flowchart of FIG. 9.

As in the previous case, upon activation, the erasure-locator module 52 requests a multiple re-reading of the memory locations $A_0, A_1, \ldots, A_{LS-1}$ already read (block 300). In all, N recovered strings $S_1, S_2, \ldots, S_N$ (for example, N=5) are thus acquired and stored in respective read registers 53 (block 305).

Figure 8:
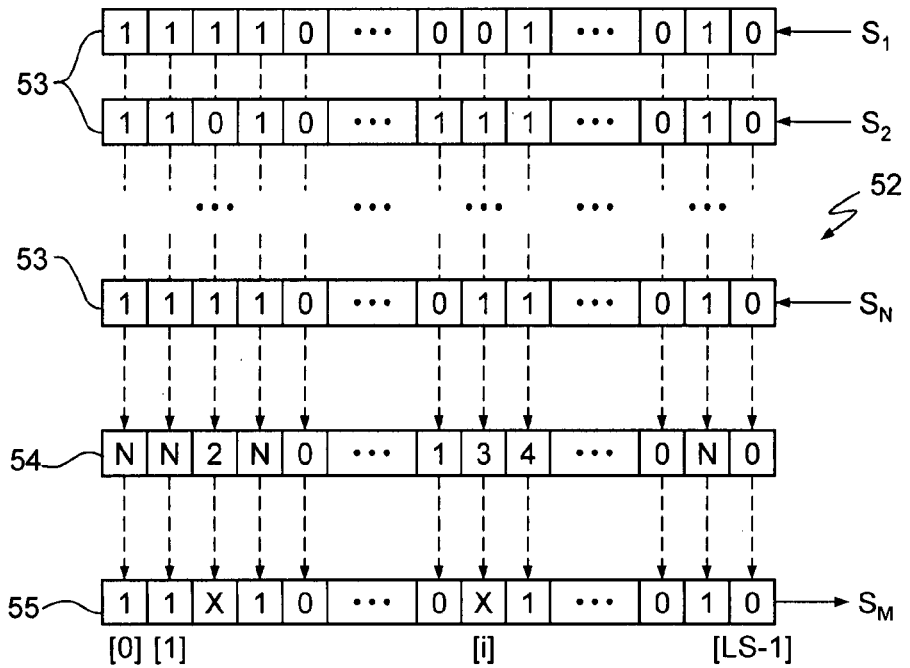
FIG. 8 is a detailed block diagram of a part of a memory device implementing a reading method according to a third embodiment of the present invention.

A bit-to-bit addition is made on the recovered strings $S_1$, $S_2, \ldots, S_N$, and the results are stored in corresponding positions of the sum register 54, defining therein a sum string $S_{SUM}$ (block 310). As shown in FIG. 8, where the erasure-locator module 52 is illustrated, the generic i-th position $S_{SUM}[i]$ of the sum string $S_{SUM}$ contains an integer comprised between 0 and N and equal to the number of bits with value 1 stored in the corresponding i-th positions of the recovered strings $S_1, S_2, \ldots, S_N$.

The sum string $S_{SUM}$ is scanned to generate a modified string $S_M$ (stored in the auxiliary register 55) and perform location of the erasures. After initializing a counter i (block 315), the erasure-locator module 52 compares the value stored in the current position $S_{SUM}[i]$ of the sum string $S_{SUM}$ indicated by the counter i with a first pre-determined threshold $TH_1$, for example 1 (block 320). If the first threshold $TH_1$ is not exceeded ($S_{SUM}[i] \leq TH_1$, output YES from block 320), the readings have returned with sufficient coherence the value 0, which is assigned to the position $S_M[i]$ of the modified string $S_M$ indicated by the counter i (block 325). Otherwise (output NO from block 320), the value stored in the current position $S_{SUM}[i]$ of the sum string $S_{SUM}$ is compared with a second threshold $TH_2$, greater than the first threshold $TH_1$ and, in the embodiment described herein, equal to $N-TH_1$ (block 330). A non-limiting example is provided by the following values: N=5, $TH_1=1$, $TH_2=4$. The first and second thresholds $TH_1$, $TH_2$ could, however, be asymmetrically chosen, in particular when an error distribution is known a priori, which is also asymmetrical.

If the value stored in the current position $S_{SUM}[i]$ of the sum string $S_{SUM}$ is higher than or equal to the second threshold $TH_2$ ($S_{SUM}[i] \geq TH_2$, output YES from block 330), the readings have returned with sufficient coherence the value 1, which is assigned to the position $S_M[i]$ of the modified string $S_M$ (block 335). Otherwise (output NO from block 330), in the current position $S_{SUM}[i]$ of the sum string $S_{SUM}$ an erasure indicator X is stored, because the readings of the corresponding memory location $A_0, A_1, \ldots, A_{LS-1}$ are not sufficiently concordant (block 340).

If the counter i indicates that the entire sum string $S_{SUM}$ has been scanned (i.e., i=LS-1, output YES from block 345), the modified string $S_M$ is made available to the decoding module 10 (block 350) for being decoded as already explained with reference to FIG. 4 (substitution of the erasure indicators with the value 0 and second decoding attempt; possibly, in the case of failure of the second decoding attempt, substitution of the erasure indicators with the value 1 and third decoding attempt). If, instead, the scanning of the sum string $S_{SUM}$ is not yet terminated (output NO from block 345), the counter i is incremented (block 355), and the operations indicated in blocks 320-340 are repeated.

The embodiment of the invention described above enables correction of the positions, in which, even though there is not total concordance in the results of successive readings, there is in any case sufficient prevalence of one value. Also in this case, in fact, the corresponding bits of the recovered strings are in practice compared with one another, and the value of the bit in the corresponding position of the sum string $S_M$ is decided on the basis of the result of the comparison. If there is sufficient prevalence of one value, also the value of the bit in the corresponding position of the sum string $S_M$ is determined. Otherwise, an erasure is located, and an erasure indicator X is inserted in the sum string $S_M$.

Note that the second embodiment of the invention corresponds to a particular case of the third embodiment, in which $TH_1=0$ and $TH_2=N$.

In addition, according to a variant (not illustrated) the reading method described with reference to FIGS. 5-7 (second embodiment) is initially executed, and, in the case of failure, the method described with reference to FIGS. 8 and 9 (third embodiment) is executed. The procedure of FIGS. 8 and 9, in fact, corrects directly some errors if bits in corresponding positions of the recovered strings $S_1, S_2, \ldots, S_N$, are not all concordant but there is sufficient prevalence of a value. Consequently, a smaller number of erasures is generated on average, and the inequality (1) is more readily satisfied.

Figure 10:
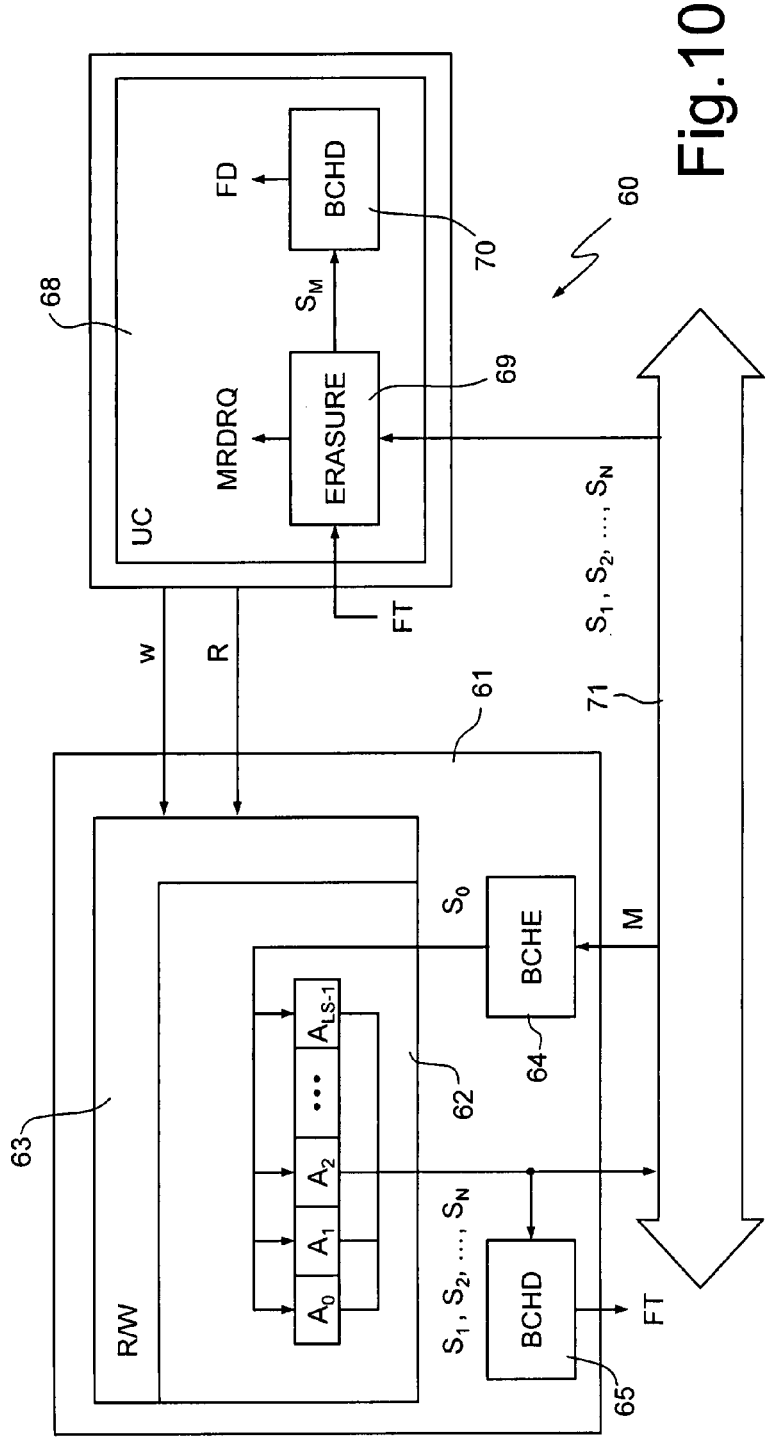
FIG. 10 is a simplified block diagram of a memory device implementing a reading method according to a fourth embodiment of the present invention.
Figure 11:
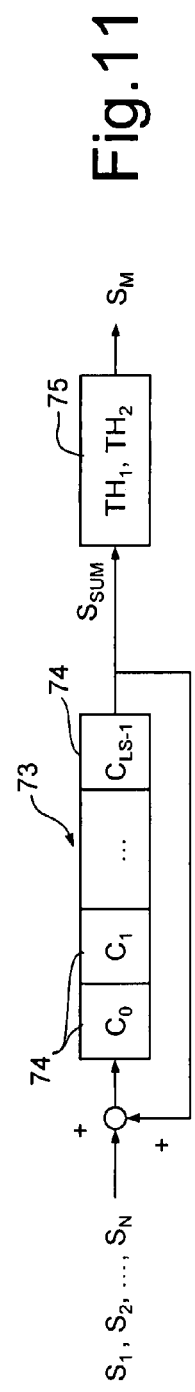
FIG. 11 is a detailed block diagram of a part of the memory device of FIG. 10.

FIGS. 10 and 11 illustrate a fourth embodiment of the invention. In this case, a memory device 60 comprises: a first chip 61, integrated in which are an array 62 of memory cells, a R/W circuit 63 and a first decoding module 65; and a second chip 67, integrated in which is a control unit 68, which includes an erasure-locator module 69 and a second decoding module 70. The first chip 61 and the second chip 67 are moreover connected and communicate with one another by means of a data bus 71.

The first and second decoding modules 65, 70 are both based upon the use of the BCH code used for encoding messages to be stored in the array 62.

When a writing operation is carried out, a message M of a pre-determined length is encoded, in a way known and not illustrated in detail, using the BCH code. Then, an origin string $S_0$ of length LS, obtained from encoding of the message M, is loaded on the data bus 71 and then stored in the array 3 at memory locations $A_0, A_1, \ldots, A_{LS-1}$. For this purpose, the control unit 2 issues a write command W appropriately synchronized to the R/W circuit 5.

In the step of reading of the memory locations $A_0$, $A_1, \ldots, A_{LS-1}$, following upon a read command R imparted by the control unit 68, a recovered string $S_1$ of length LS is set on the data bus 71 and, moreover, is loaded both into the first decoding module 65, so as to be decoded, and into the erasure-locator module 69. The first decoding module 65 carries out a first decoding attempt. If this is unsuccessful, the first decoding module 65 generates a temporary-failure signal FT, which activates the erasure-locator module 69 for executing a procedure of location and correction substantially as described with reference to FIG. 9 (except for what will be specified hereinafter).

In the embodiment described herein, the erasure-locator module 69 comprises a sum register 73, including a number of counters 74 equal to the length LS of the recovered string $S_1$, and a threshold comparator 75 (FIG. 11).

Initially, in practice, the erasure-locator module 69 stores each position of the recovered string $S_1$ in a respective counter 74 of the sum register 73. After activation, the erasure-locator module 69 requests a multiple re-reading of the memory locations $A_0, A_1, A_{LS-1}$ already read, by means of a multiple read-request internal signal MRDRQ. In this way, in all N recovered strings $S_1, S_2, \ldots, S_N$ are sequentially acquired (for example N=5). In the embodiment described herein, each recovered string $S_2, \ldots, S_N$, just made available, is added to the contents of the sum register 73, and the results of the adding operation is again stored in the sum register 73 itself (in practice, each counter 74 is incremented if in the corresponding position of the last recovered string $S_2, \ldots, S_N$ made available the value "1" is present, and remains unaltered otherwise).

Hence, at the end of the N readings, the sum register 73 contains a sum string $S_{SUM}$, which is supplied to the threshold comparator 75. The threshold comparator 75 compares the contents of each position $S_{SUM}[i]$ of the sum register 73 with a first threshold $TH_1$ and a second threshold $TH_2$ and, on the basis of the comparison, assigns to the corresponding position of a modified string $S_M$ the value "1", the value "0", or else an erasure indicator X, using the procedure already described with reference to blocks 320-355 of FIG. 9 (note that, with $TH_1=0$ and $TH_2=N$ the procedure coincides in effect with blocks 220-255 of FIG. 7).

The sum string $S_{SUM}$ is then made available to the second decoding module 70, which executes the decoding procedure already described with reference to FIG. 4.

In practice, storage of the recovered strings $S_2, \ldots, S_N$ and their addition are executed simultaneously, thus obtaining a saving in terms of time and of area occupied (just the sum register 73 is sufficient, instead of a register for each re-reading).

Finally, it is evident that modifications and variations can be made to the method and device described herein, without departing from the scope of the present invention, as defined in the annexed claims. In particular, the messages to be stored could be encoded outside the memory device during a preliminary encoding step and presented in an already encoded form to be stored without any further processing. In addition, the memory device can include a read circuit and a write circuit that are separate and independent.

Although preferred embodiments of the device of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A reading method for a memory device with embedded error-correcting code (ECC), comprising:
    executing a first reading of a plurality of memory locations, to generate a first recovered string;
    performing a first decoding attempt using said first recovered string;
    performing at least one second reading of said memory locations to generate at least one second recovered string if said first decoding attempt failed;
    comparing said first recovered string and at least said second recovered string to generate a modified string in which erasures are located; and
    executing at least one second decoding attempt using said modified string.

2. The method according to claim 1, wherein comparing comprises performing a bit-to-bit comparison between said first recovered string and at least said second recovered string.

3. The method according to claim 2, wherein comparing further comprises:
    if bits in corresponding positions of said first recovered string and of said at least one second recovered string have a same value, assigning said same value to a bit in a corresponding position of said modified string; and
    indicating an erasure in said corresponding position of said modified string, otherwise.

4. The method according to claim 1, wherein performing at least one second reading of said memory locations comprises executing a plurality of second readings of said memory locations.

5. The method according to claim 4, wherein comparing comprises performing a bit-to-bit addition of said first recovered string and said second recovered strings.

6. The method according to claim 5, wherein comparing further comprises:
    assigning a first value to a position of said modified string, if a sum of bits contained in corresponding positions of all the second recovered strings is equal to 0;
    assigning a second value to said position of said modified string, if said sum of bits in corresponding positions of all the second recovered strings is equal to a total number of said first and second readings;
    associating an erasure indicator to said position of said modified string, otherwise.

7. The method according to claim 5, wherein said modified string is generated by:
    assigning a first value to a position of said modified string, if a sum of bits contained in corresponding positions of all the second recovered strings is lower than or equal to a first threshold;
    assigning a second value to said position of said modified string, if said sum of bits contained in corresponding positions of all the second recovered strings is higher than or equal to a second threshold, which is in turn greater than said first threshold;
    associating an erasure indicator to said position of said modified string if said sum of bits in corresponding positions of all the second recovered strings is between said first threshold and said second threshold.

8. The method according to claim 1, wherein executing at least one second decoding attempt comprises:
    assigning said first value to bits in positions of said modified string corresponding to erasures;
    executing said second decoding attempt, using said modified string;
    if said second decoding attempt fails, assigning said second value to bits in said positions of said modified string corresponding to erasures; and
    executing a third decoding attempt, using said modified string.

9. The method according to claim 1, wherein the ECC is a BCH code.

10. A memory device with embedded error-correcting code (ECC), comprising:
    a memory array;
    a read circuit for reading said memory array and generating recovered strings; and
    an error-correcting encoding and decoding device, including a decoding module for decoding said strings;
    wherein said error-correcting encoding and decoding device comprises an erasure-locator module, selectively activatable when said decoding module fails a first decoding attempt using one said first recovered string generated by said read circuit following upon a first reading of said memory locations, said erasure-locator module requesting at least one second reading of said memory locations, receiving at least one further recovered string generated by said read circuit on the basis of said at least one second reading of said memory locations, generating, on the basis of a comparison between said first recovered string and at least said second recovered string, a modified string in which erasures are located, and supplying said modified string to said decoding module for a second decoding attempt, using said modified string.

11. The device according to claim 10, wherein said erasure-locator module performs a bit-to-bit comparison between said first recovered string and at least said second recovered string.

12. The device according to claim 10, wherein said erasure-locator module operates to:
- if bits in corresponding positions of said first recovered string and of said at least one second recovered string have a same value, assign said value to a bit in a corresponding position of said modified string;
- indicate an erasure in said corresponding position of said modified string, otherwise.

13. A reading method for a memory device, comprising:
- executing a first reading of a plurality of memory locations, to generate a first recovered string encoded with an error correcting code;
- first decoding of said first recovered string;
- executing at least one second reading of said memory locations to generate at least one second recovered string if said first decoding fails;
- comparing said first recovered string and at least said second recovered string to generate a modified string which includes an identification of bit erasures; and
- second decoding of said modified string.

14. The method according to claim 13, wherein comparing comprises:
- performing a bit-to-bit comparison between said first recovered string and at least said second recovered string;
- if bits in corresponding positions of said first recovered string and of said at least one second recovered string have a same value, assigning said same value to a bit in a corresponding position of said modified string; and
- otherwise, indicating an erasure in said corresponding position of said modified string.

15. The method according to claim 14, wherein second decoding comprises:
- assigning said first value to bits in positions of said modified string corresponding to erasures;
- executing second decoding using said modified string with assigned first values;
- if said second decoding fails, assigning said second value to bits in said positions of said modified string corresponding to erasures; and
- executing third decoding using said modified string with assigned second values.

16. The method according to claim 13, wherein executing at least one second reading of said memory locations comprises executing a plurality of second readings of said memory locations.

17. The method according to claim 16, wherein comparing comprises performing a bit-to-bit addition of said first recovered string and said second recovered strings.

18. The method according to claim 17, wherein comparing further comprises:
- assigning a first value to a position of said modified string, if a sum of bits contained in corresponding positions of all the second recovered strings is equal to 0;
- assigning a second value to said position of said modified string, if said sum of bits in corresponding positions of all the second recovered strings is equal to a total number of said first and second readings;
- associating an erasure indicator to said position of said modified string, otherwise.

19. The method according to claim 18, wherein second decoding comprises:
- assigning said first value to bits in positions of said modified string corresponding to erasures;
- executing second decoding using said modified string with assigned first values;
- if said second decoding fails, assigning said second value to bits in said positions of said modified string corresponding to erasures; and
- executing third decoding using said modified string with assigned second values.

20. The method according to claim 17, wherein said modified string is generated by:
- assigning a first value to a position of said modified string, if a sum of bits contained in corresponding positions of all the second recovered strings is lower than or equal to a first threshold;
- assigning a second value to said position of said modified string, if said sum of bits contained in corresponding positions of all the second recovered strings is higher than or equal to a second threshold, which is in turn greater than said first threshold;
- associating an erasure indicator to said position of said modified string if said sum of bits in corresponding positions of all the second recovered strings is between said first threshold and said second threshold.

21. The method according to claim 20, wherein second decoding comprises:
- assigning said first value to bits in positions of said modified string corresponding to erasures;
- executing second decoding using said modified string with assigned first values;
- if said second decoding attempt fails, assigning said second value to bits in said positions of said modified string corresponding to erasures; and
- executing third decoding using said modified string with assigned second values.

22. The method according to claim 13, wherein the error correcting code is a BCH code.

\* \* \* \* \*